US008116733B2

(12) United States Patent
Kotzin

(10) Patent No.: US 8,116,733 B2
(45) Date of Patent: Feb. 14, 2012

(54) METHOD AND APPARATUS FOR A WIRELESS MOBILE DEVICE WITH SIM CHALLENGE MODIFICATION CAPABILITY

(75) Inventor: Michael D. Kotzin, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 860 days.

(21) Appl. No.: 11/306,517

(22) Filed: Dec. 30, 2005

(65) Prior Publication Data
US 2007/0157023 A1 Jul. 5, 2007

(51) Int. Cl.
*H04M 1/66* (2006.01)
(52) U.S. Cl. ........ 455/411; 380/247; 380/255; 713/168; 713/169
(58) Field of Classification Search .......... 455/411; 370/247–250, 255–285; 713/168, 169
See application file for complete search history.

(56) References Cited

U.S. PATENT DOCUMENTS

| | | | | |
|---|---|---|---|---|
| 5,159,634 A | * | 10/1992 | Reeds, III | 380/42 |
| 5,668,875 A | * | 9/1997 | Brown et al. | 380/248 |
| 6,014,085 A | * | 1/2000 | Patel | 455/410 |
| 6,853,729 B1 | * | 2/2005 | Mizikovsky | 380/249 |
| 2002/0018569 A1 | * | 2/2002 | Panjwani et al. | 380/247 |
| 2005/0149740 A1 | | 7/2005 | Kotzin et al. | |

OTHER PUBLICATIONS

Aamodt, Tom E. et al.; Security in UMTS-Integrity; Telenor R&D; Version 1.00: Feb. 5, 2001.

* cited by examiner

*Primary Examiner* — Olumide T Ajibade Akonai
*Assistant Examiner* — Jaime Holliday
(74) *Attorney, Agent, or Firm* — Faegre Baker Daniels LLP

(57) ABSTRACT

A wireless mobile device (104) provides challenge/response based authentication by receiving a first portion of a challenge (132) from an external authentication unit (102), such as a network unit, and utilizes an internal partial challenge generator (114) that internally provides a second portion of the challenge (138) and provides the internally generated second portion of the challenge (138) back to the authentication unit (102). The wireless mobile device (104) also includes combiner logic (116) that combines the externally received first portion of the challenge (132) with the internally produced second portion of the challenge (138) to produce a complete challenge (144). The wireless mobile device (104) then utilizes a response generators (118) that takes the complete challenge (144) that was produced and generates a response (146) based on the complete challenge (144), and other secret information (110) if desired using a suitable cryptographic operation. The response (146) is sent back to the authentication unit (102) for verification.

20 Claims, 3 Drawing Sheets

METHOD AND APPARATUS FOR A WIRELESS MOBILE DEVICE WITH SIM CHALLENGE MODIFICATION CAPABILITY

FIELD OF THE INVENTION

The invention relates generally to wireless devices in systems that utilize a challenge/response authentication scheme, and more particularly to wireless mobile devices that employ subscriber identity modules (SIMs) that are used in the challenge/response scheme.

BACKGROUND OF THE INVENTION

Wireless devices such as mobile cell phones, may employ a subscriber identity module (SIM) which is used, for among other things, to allow a network authentication unit to authenticate a cell phone before providing service to the cell phone. Subscriber identity modules may be in any suitable form including SIM cards, embedded SIM circuits, or any other suitable logic that provides the functions of a subscriber identity module. The SIM is typically issued by a network operator and the SIM includes, among other things, subscriber identification data unique to the subscriber unit and a secret identification information securely stored in the SIM, suitable cryptographic algorithms to generate a response in reply to an authentication challenge sent by the network prior to granting access to the system or access to other desired resources.

For example, the subscriber identity module (SIM) may be a smart chip card that contains a microprocessor chip and corresponding memory that stores unique subscriber identification information including the subscriber telephone number and secret information and is also used to store instant messages, phone lists, and other information in a secure manner as known in the art. As used herein, a SIM may also be considered a logical application running on a smart card or other processor. As such the SIM provides secure storage of keys identifying a mobile phone service subscriber and also subscription information, preferences and storage of text messages and other information. They are used in many systems including Group Special Mobile System (GSM), UMTS systems and any other suitable wireless communication systems.

For example, an authentication unit in a network which utilizes the same cryptographic algorithm as the SIM card, may generate a random challenge to the wireless mobile device. In response, the wireless mobile device utilizes its secret data and the random challenge information from the network and generates a response using the cryptographic algorithm. The response or reply is then sent back to the network based authentication unit. The network authentication unit locally generates an expected response using the challenge sent by the authentication unit as well as a locally stored copy of the secret information. If the received response from the wireless mobile device matches the locally generated expected response, then access is granted to the wireless mobile device to carry out the call or gain access to any other suitable resource.

It has been proposed to provide a technique so that a third party can authenticate to a wireless mobile device wherein the wireless mobile device uses its SIM based challenge/reply technique. For example, if a third party other than the cellular operator wishes to provide information to a given wireless mobile unit, it has been proposed to allow the third party to send many random challenges and receive responses from the wireless mobile device for those challenges. The third party then stores the challenge/reply pairs and later uses the challenge and previously received reply to authenticate with the mobile device at a later date. Because the third party had already received responses based on challenges initially, when at a later date when the third party wishes to authenticate the mobile device, it sends the same previously sent challenge and knows what response to expect based on the previous response it got when it sent the challenge the first time. Accordingly, the same challenge is sent on more than one occasion. However, allowing a third party access to authenticate a wireless mobile device may not be desirable to a system operator.

Accordingly, a need exists for apparatus systems and methods that can provide a suitable challenge/response authentication operation.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Figure 1:
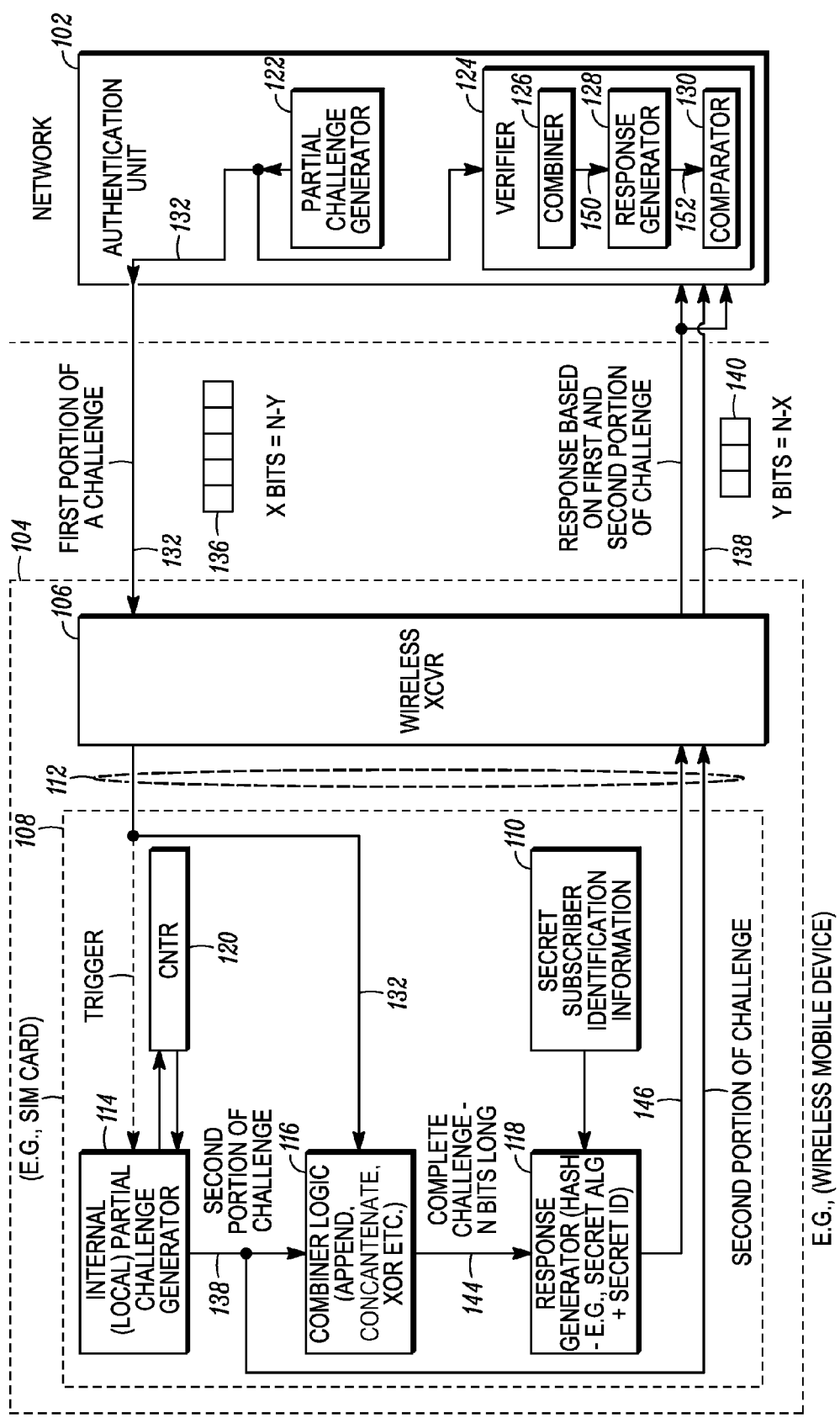
FIG. 1 is a block diagram illustrating one example of a system employing a wireless mobile device in accordance with one embodiment of the invention.

Briefly, a wireless mobile device provides challenge/response based authentication by receiving a first portion of a challenge from an external authentication unit, such as a network unit, and utilizes an internal partial challenge generator that internally provides a second portion of the challenge and provides the internally generated second portion of the challenge back to the authentication unit. The wireless mobile device also includes combiner logic that combines the externally received first portion of the challenge with the internally produced second portion of the challenge to produce a complete challenge. The first portion of the challenge may be, for example, a random number of a first bit length and the second portion of the challenge that is generated internally to the wireless mobile device may be another random number of a different bit length. The random numbers are combined by the combiner logic by any suitable arithmetic technique to combine the first and second portions of the challenge to produce a complete challenge. The wireless mobile device then utilizes a response generator that takes the complete challenge that was produced and generates a response based on the complete challenge, and other secret information if desired using a suitable cryptographic operation. The response generator may utilize secret information corresponding to subscriber identification data in addition to the complete challenge information to produce the response that is sent back to the authentication unit based on the initial partial challenge or first portion of a challenge sent by the authentication unit. Corresponding methods are also described.

Among other advantages, the technique effectively further randomizes, under control of the wireless device and in a secure way, challenges for which it must generate a response or reply to an authentication unit. This can prevent a third party from requesting and storing a subset of challenge/responses for future use since the second portion of the challenge changes and is required to produce the response and verify the sender of the response. In addition, a SIM's internal cryptographic algorithm need not change since the same length of the complete challenge can be the same as previous techniques For example, for a system that utilizes a fixed bit length challenge string (e.g., 128 bit challenge, 64 bit challenge etc.), the authentication unit can send a partial challenge or subset of the complete challenge string (e.g., 32 bits of a 64 bit challenge) to the wireless mobile device. The wireless mobile device locally and securely generates the remaining number of bits (e.g., 32 bits) randomly to complete the challenge string and generates a response and send the remaining bits to the authentication unit. Also if desired a varying length challenge can be used if different authentication algorithms are also employed to accommodate the length of the complete challenge. Other advantages will be recognized by those of ordinary skill in the art.

FIG. 1 illustrates an example of a wireless communication system 100 that employs an authentication unit 102 and a subscriber such as a wireless mobile device 104 that are in communication via a wireless network such as, but not limited to, a GSM network, CDMA wireless network or any other suitable network. The authentication unit 102 may be a centralized authentication center, back end server, web server or any suitable device or devices. The authentication unit 102 may include, for example, one or more processing devices such as microprocessors, DSPs, state machines, discrete logic or any suitable combination of hardware, software and firmware and corresponding memory if desired, that stores executable instructions that when executed, cause the processing devices and hence authentication unit to operate as described herein. The memory may be RAM, ROM, or any other suitable memory that stores executable instructions and other data as necessary.

The wireless mobile device 104 will be described in this example as a wireless cell phone, however it will be recognized that any suitable wireless mobile device may be used. The wireless mobile device 104 provides challenge/response based authentication with the authentication unit 102. The challenge/response authentication procedure may be carried out at any suitable time including when the wireless mobile device first attempts to access a wireless system, after allowed access to the system such as during data calls, voice calls, or while carrying out certain transactions such as Internet based transactions or any other suitable transactions.

The wireless mobile device 104 includes a wireless transceiver 106 which may be coupled to one or more antenna subsystems (not shown) to allow wireless communication with the authentication unit 102. It will be recognized that the authentication unit 102 may be in wireless communication with the wireless mobile device 104 through intermediate network elements including any suitable base stations where the authentication unit may be co-located at a base station or any other suitable location within the network. The wireless mobile device 104 includes a challenge/response authentication circuit 108 which may take the form of a subscriber identity module (SIM) circuit or card or any other suitable structure and as such, may include one or more processing devices and associated memory that stores executable instructions that the processor or processing devices execute to carry out the operations described herein. It will be recognized also that the challenge/response authentication circuit 108 may be also implemented using discrete logic, ASICs, state machines, or any other suitable combination of hardware, software or firmware. In this embodiment, the challenge/response authentication circuit 108 is a secure circuit that includes logic (in the form of a processor executing instructions, or any other suitable structure) that carries out operations described herein and stores at least secret wireless mobile device identification information 110 which is a form of a secret identifier not sent externally from the wireless mobile device and known only to the wireless mobile device 104 and the authentication unit 102.

The challenge/response authentication circuit 108 is operatively coupled with the wireless transceiver 106 through a suitable bus or buses or other logic as required or generally shown as 112. The challenge/response authentication circuit 108 includes an internal partial challenge generator 114, combiner logic 116, a response generator 118 and if desired, a counter 120. These elements are shown to be functional blocks and as such may be carried out using any suitable structure as noted above.

The authentication unit 102 includes a partial challenge generator 122, and if desired, a verifier 124 that verifies information from the wireless mobile device 104 to determine whether the wireless mobile device 104 is authenticate and can be granted access to desired resources. These elements as indicated above may be implemented using any suitable structure including software modules executing on one or more processors as noted above. The verifier 124, similar to the wireless mobile device 104, includes a combiner 126 and a response generator 128. In addition, the verifier 124 may include a comparator 130 or the comparator may be located in a different unit such as a unit in a home cell.

The wireless transceiver 106 receives a first portion of a challenge 132 from the authentication unit 102 as, for example, generated by the partial challenge generator 122. The first portion of the challenge 132 may be, for example, bits representing a random number generated, for example, by a random number generator of the partial challenge generator 122 or data read from a table or other suitable source. It will be recognized that it may also be any other suitable data useful for authentication as desired. In this example, the first portion of the challenge is shown as being X bits long generally shown as 136. Where a challenge of length N is used, the first portion of the challenge has a length X and a second portion of the challenge has a length Y such that N=X+Y. The first portion of the challenge is communicated by the external authentication unit 102 which is external from the wireless mobile device 104. The internal partial challenge generator 114, in this example, includes a random number generator that is part of a trusted platform and as know in the art may generate the random number in any suitable manner. The random number generator is preferably an unchangeable, non-resetable random number generator. The internal partial challenge generator 114 is notified of the first portion of the challenge and subsequently generates an internally generated second portion of a challenge 138 in response to the first portion of the challenge 132. However, it will be recognized that the second portion of a challenge 138 may actually be generated prior to the first portion of a challenge 132 if, for example, the system wants the subscriber to send the second challenge portion 138 prior to receiving the first portion of a challenge 132. This may be useful to give the authentication unit 102 ample time to generate an expected response if the processing loading on the authentication is high. However, for purposes of illustration only, in this example the internal second challenge portion generator 114 generates the second portion of the challenge 138 in response to (triggered by the receipt of) the first portion of the challenge 132. The internal partial challenge generator 114 provides the second portion of the challenge 138 internally to the device and in this example, internally to the SIM card and also provides the internally generated second portion of the challenge 138 to the wireless transceiver 106 for transmission to the authentication unit 102. The generated second portion of the challenge 138 may also be, for example, a random number of the same or different length and in this example is shown to be a random number having fewer bits Y indicated as 140 than the sent number of bits in the first portion of the challenge 132, but in this example X=N−Y and Y=N−X. However, any suitable length may be used.

The combiner logic 116 arithmetically combines the first portion of the challenge 132 and the second portion of the challenge 138 to combine the externally received first portion of the challenge 132 with the internally produced second portion of the challenge 138 to produce a complete challenge 144. In this example, the combiner logic may simply append the bits to one another, concatenate the bits, exclusive OR the bits of the two portions of the challenge, or any other suitable combination may be carried out. The response generator 118 carries out cryptographic operations such as hash functions, or other suitable cryptographic operations using suitable executable code or other circuits that carry out cryptographic algorithms as known in the art. In this example, the response generator 118 produces a response 146 to the complete challenge 144, based on the complete challenge 144 for transmission to the external authentication unit 102. The response generator 118 uses the secret wireless mobile device identification information 110 as part of the cryptographic process in addition to the complete challenge 144 to generate the response 146. Stated another way, the internal partial challenge generator 114 provides the second portion of the challenge 138 as noted above, by generating a random number in one example as the second portion of the challenge. The combiner logic 116 combines the generated random number with the first portion of the challenge 132 to produce the complete challenge 144. The response generator 118 generates the response 146 based on an application of a cryptographic algorithm that uses both the complete challenge 144 and the secret wireless mobile device identification information 110. As such, each response 146 is unique. Both the response 146 and the second portion of the challenge 138 are communicated to the authentication unit 102 so that the authentication unit can perform proper verification of the wireless mobile device 104.

If desired, the challenge/response authentication circuit 108 may include the counter 120 that counts a number of times that a same second portion of the challenge 138 has been used to generate a response 146 and wherein the internal partial challenge generator 114 generates a new second portion of a challenge in response to the count tracked by the counter 120. For example, if each first portion of the challenge 132 is a different random number, the internal partial challenge generator 114 may reuse the same random number as the second portion of the challenge for multiple authentication processes but the counter 120 may keep track of the number and after a threshold is reached, a new random number is generated to serve as the second portion of a challenge 138. However, any other suitable mechanism may be used to cause the second portion of the challenge to be changed. The wireless transceiver 106 sends both the response 146 and the second portion of the challenge 138 to the authentication unit 102 in response to the first portion of a challenge 132 being sent by the authentication unit 104. However, as noted above, the order of the messages may be varied.

In one embodiment, the challenge/response authentication circuit 108 is a secure subscriber identity module such as a SIM card that is either fixed or removable from the wireless mobile device. As shown, the secure subscriber identity module may include the internal partial challenge generator 114, the combiner logic 116 and the response generator 118.

After the external authentication unit 102 receives the response 146 based on the first and second portion of the challenges 132 and 138, and the second portion of the challenge 138 (which may be suitably encrypted if desired or may be left unencrypted), it may attempt to verify the wireless mobile device 104 or may forward challenge/expected responses to another unit and let another unit perform the comparison. The authentication unit 102 uses the same cryptographic algorithm used by the wireless mobile device 104 and the same subscriber identification information 110 which is known by the authentication unit 104 to generate the complete challenge and expected response. Accordingly, the verifier 124 carries out the same operations using the same information as the wireless mobile device 104 and employs corresponding combiner logic 126 and response generator 128 to produce a copy of the complete challenge shown as 150 as well as an expected response shown as 152 using the received second portion of the challenge 138 and its locally generated first portion of the challenge 132. The expected response 152 is then compared to the received response 146 by comparator 130 (locally or by another unit). If the responses 146 and 152 match, then the wireless mobile device 104 is properly authenticated and given access to the desired resources. If the expected response 152 does not match the received response 146, then authentication is denied and the authentication unit 104 may resend the first portion of the challenge 132, generate a new portion of a challenge or notify the wireless mobile device 104 that access has been denied. Any other suitable operations may also be carried out.

Figure 2:
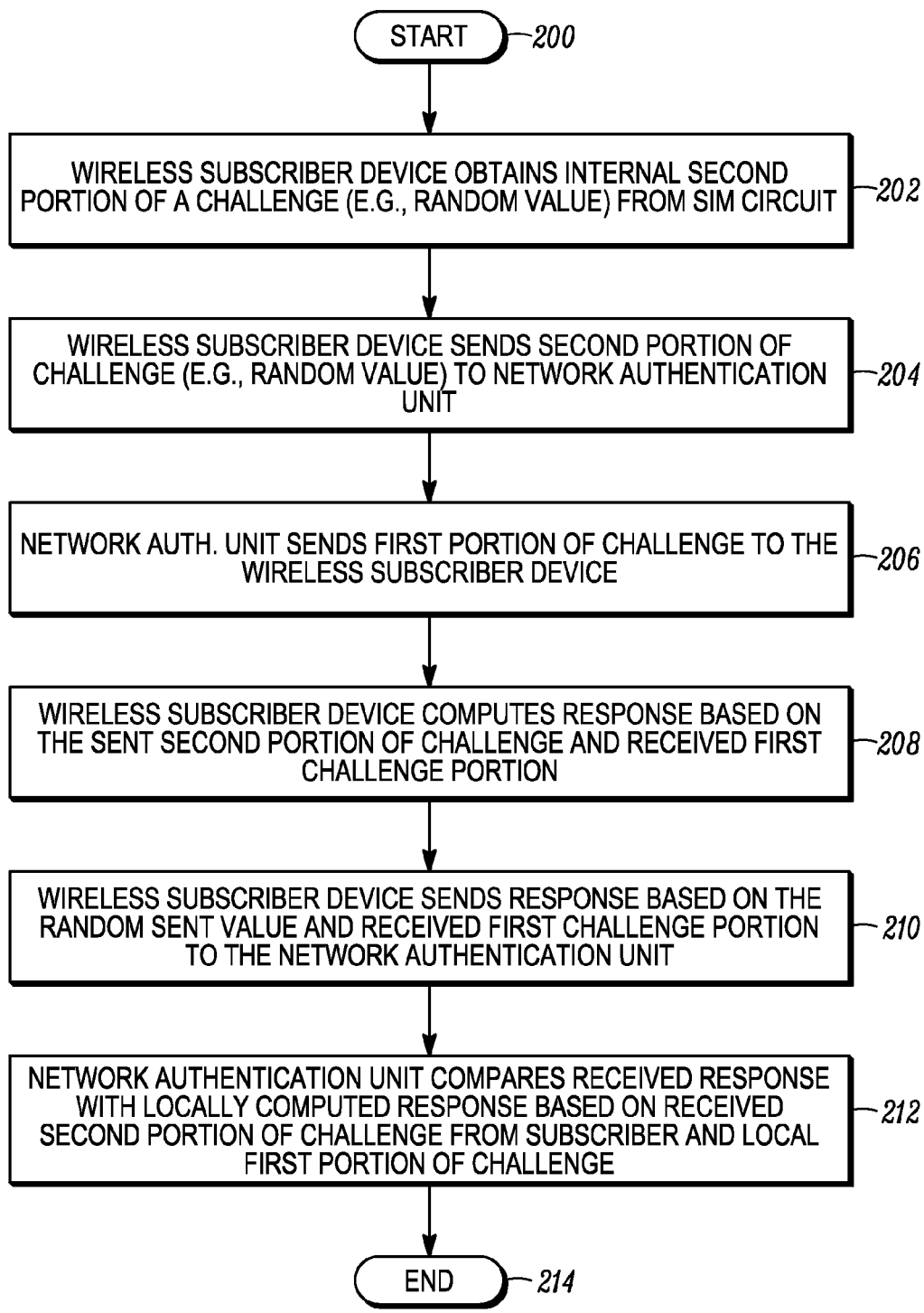
FIG. 2 is a flowchart illustrating one example of a method for providing challenge/response based authentication in accordance with one embodiment of the invention.

FIG. 2 is a flowchart illustrating one example of a method for providing challenge/response based authentication that may be carried out, for example, by the system 100 shown in FIG. 1, or any other suitable system, devices or structures. As shown in block 200, the method may start by the wireless device 104 for example, requesting access to a resource that requires authentication by the authentication unit 102. This may include, for example, sending public subscriber identification data (or temporary identification data) over the air for the authentication unit 102 as part of the initial logon process in addition to a password or any other suitable information. The method shown herein is in a different order from the operations described with respect to FIG. 1 since the order of the steps may be varied depending on the desired operation of the system. It will also be recognized that the operations described herein can be performed in any suitable order. As shown in block 202, the method includes the wireless mobile device 104 wirelessly transmitting a second portion of the challenge 138 from the secure challenge/response authentication circuit 108 to the authentication unit 102. This may be done, for example, prior to the first portion of the challenge 132 being generated and may be part of, for example, an initial logon process if desired. For example, the wireless mobile device 104 may send the second portion of the challenge 138 in advance of receiving the first portion of the challenge 132 if desired or at any other suitable time to allow, for example, the authentication unit 104 to begin to prepare a corresponding challenge/expected response pair for the current authentication process so that the challenge/expected response pair can be forwarded to a home system or other location which may then carry out the operation of the comparator 130. Accordingly, it will be recognized that the comparator 130 may be suitably located at any point in the system but it is preferable that the generation of the expected response 152 is performed at the secure authentication unit 102 such as, but not limited to, a centralized authentication center (as known in the art).

As shown in block 202, the method includes the wireless mobile device 104 obtaining the internal second portion of the challenge 138 such as by reading a random number from a lookup table, causing a random number generator to generate a random number, or any other suitable technique for obtaining a second portion of a challenge which is preferred to be a random number, however any other data may also be employed that provides the desired level of security.

As shown in block 204, the method includes sending the second portion of the challenge 138 to the authentication unit 102. The network authentication unit 102 may then send the first portion of the challenge 132 to the wireless subscriber in response to receiving the second portion of the challenge 138, as shown in block 206.

As shown in block 208, the method includes generating the response 146 using the first portion of the challenge 132 and the second portion of the challenge 138 that was generated internally. As shown in block 210, the method includes sending the response 146 that is based on the second portion of the challenge 138 and the received first portion of the challenge 132. This is sent for use by the authentication unit 102. As shown in block 212, the method includes comparing the received response 146 to the computed expected response 152 wherein the computed expected response 152 is based on the received second portion of the challenge 138 and on the first portion of the challenge 132 generated and provided externally to the wireless mobile device 104. As shown in block 214, the method may end by authentication being acceptable to the authentication unit and thereby granting access to the wireless mobile device 104 or denying access to the wireless mobile device 104 if the responses do not match.

Figure 3:
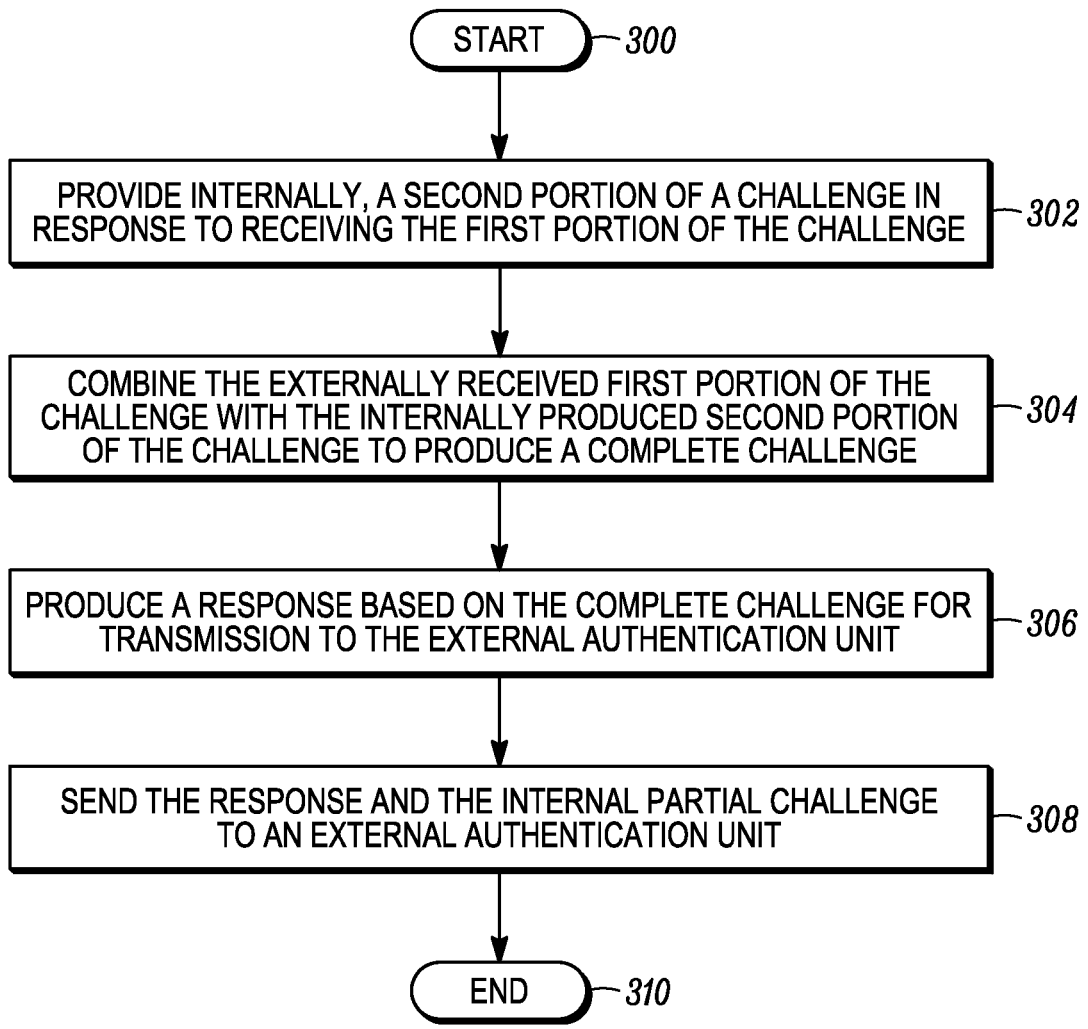
FIG. 3 is a flowchart illustrating one example of a method for providing challenge/response based authentication in accordance with one embodiment of the invention.

FIG. 3 illustrates a method for providing challenge/response based authentication from the perspective of the wireless mobile device 104. As shown in block 300, the method may start, for example, by initiating communication with the network and the authentication unit 102 and sending any appropriate information necessary to carry out the authentication process. As shown in block 302, the method includes providing internally, the second portion of the challenge 138, for example, in response to receiving the first portion of the challenge 132 if it has already been received or based on an initialization procedure or at any other suitable time. As shown in block 304, the method includes combining the externally received first portion of the challenge with the internally produced second portion of the challenge 132 and 138 respectively, to produce the complete challenge 144. As shown in block 306, the method includes producing the response 146 based on the complete challenge 144 and, for example, the secret mobile device identification information 110, for transmission for the external authentication unit 102. As shown in block 308, the method includes sending the response 146 and the internal partial challenge, or second portion of the challenge 138, to the external authentication unit 102. As shown in block 310, the wireless mobile device 104 may then wait for another communication on behalf of the authentication unit 102 or other unit indicating whether authentication has been granted.

In another embodiment, the wireless mobile device 104 generates not only a current second portion of a challenge 138 but another future second portion of a challenge for a future challenge/response authentication procedure. Accordingly, the future second portion of the challenge may be sent to the authentication unit 102 so that the authentication unit 102 can generate not only a current challenge/expected response pair, but a future challenge/expected response pair by also generating a future first portion of a challenge. The current challenge/expected response pair and the future challenge/future expected response pair can then be forwarded to the mobile device's home system or any other location so that if the current second portion of the challenge changes in the interim, a next challenge/response authentication process can be carried out in a timely manner. In addition, this sending of future partial challenge information to an authentication unit can give the authentication unit ample time to process the expected responses since such authentication units may be heavily loaded if it is centralized given the number of subscribers using the system that it has to generate expected responses for. It will be recognized that any suitable protocol under the control of the network may be used to facilitate the communication of the sending of a current or future random number, also referred to as the second portion of the challenge. As such, visited location registers (VRLs) may store the challenge/expected reply pair and the home network may carry out the comparison to grant access to the expected resource.

For example, the authentication unit 102 wirelessly transmits the first portion of a challenge 132 to the wireless mobile device 104. The mobile device generates the response 146 and sends it for the authentication unit. The authentication unit 102 generates the expected response 152 based on the locally stored first portion of the challenge 132 and the received second portion of the challenge 138. The authentication unit 102 also generates a future expected response based on a received future second portion of a challenge that was generated by the wireless mobile device 104 and a future first portion of another challenge generated by the authentication unit 102. The authentication unit 102 sends the expected response 152 and the future expected response to a remote unit, such as a network element in a home cell for comparison with the 146 received response that the home cell passed on to the authentication unit when it was sent by the mobile device. If desired, instead of response being sent to the remote unit, a challenge/response pair can be sent.

The authentication unit 102 generates a challenge/expected response pair based on the first portion of the challenge and the received second portion of the challenge and generates a future challenge/expected response pair based on the received future second portion of a challenge and a generated future first portion of the challenge. These can be sent to the remote unit that compare the received response and corresponding challenge that it sent to the mobile device with the expected response to determine if authentication should be granted.

Among other advantages, the above described systems, apparatus and methods, allow a mobile device to produce a portion of a complete challenge used to generate a response in a random and secure way that is not controllable by an external third party or system operator. The second portion of the challenge is unpredictable and uncontrollable outside of the device. Other advantages will be recognized by those of ordinary skill in the art.

The above detailed description of the invention and the examples described therein have been presented for the purposes of illustration and description only and not by limitation. It is therefore contemplated the present invention cover any and all modifications, variations, or equivalents that fall in the spirit and scope of the basic underlying principles disclosed above and claimed herein.

What is claimed is:

1. A wireless mobile device for providing challenge/response based authentication comprising:

a wireless transceiver operative to receive a first portion of a challenge from an external authentication unit;

an internal partial challenge generator, operatively coupled to the wireless transceiver, operative to provide internally, a second portion of the challenge and to provide the internally generated second portion of the challenge without the first portion to the wireless transceiver for transmission for the authentication unit;

combiner logic, operatively coupled to the internal partial challenge generator, and operative to combine the externally received first portion of the challenge with the internally produced second portion of the challenge to produce a complete challenge; and a response generator, operatively coupled to the wireless transceiver, and operative to produce a response from the complete challenge for transmission to the external authentication unit, wherein the response for transmission is the same response generated from the complete challenge.

2. The wireless mobile device of claim 1 wherein the internal partial challenge generator provides the second portion of the challenge by generating a random number as the second portion of the challenge and wherein the combiner logic combines the random number with the first portion of the challenge to produce the complete challenge and wherein the response generator generates the response based on an application of a cryptographic algorithm using both the complete challenge and secret wireless mobile device identification information.

3. The wireless mobile device of claim 1 wherein the received external first portion of the challenge had a first bit length and wherein the internally generated second portion of the challenge has a second and different bit length.

4. The wireless mobile device of claim 1 comprising a counter operative to count a number of times that a same second portion of the challenge has been used to generate a response and wherein the internal partial challenge generator generates a new second portion of a challenge in response to the count.

5. The wireless mobile device of claim 1 wherein the transceiver sends both the response and the second portion of the challenge to the authentication unit in response to the received first portion of the challenge.

6. The wireless mobile device of claim 1 wherein the wireless transceiver is operative to send the response and the second portion of the challenge to effect authorization by the external authentication unit.

7. A wireless mobile device for providing challenge/response based authentication comprising:

a secure subscriber identity module (SIM) comprising:

an internal partial challenge generator operative to provide internally, a second portion of a challenge in response to receiving an external first portion of the challenge and to provide the internally generated second portion of the challenge without the first portion for transmission to the authentication unit;

combiner logic, operatively coupled to the internal partial challenge generator, and operative to combine the externally received first portion of the challenge with the internally produced second portion of the challenge to produce a complete challenge; and a response generator to produce a response from the complete challenge for transmission to the external authentication unit with the second portion, wherein the response for transmission is the same response generated from the complete challenge.

8. A method for providing challenge/response based authentication comprising:

providing internally, via a wireless mobile device, a second portion of a challenge;

combining, by the wireless mobile device, an externally received first portion of the challenge with the internally produced second portion of the challenge to produce a complete challenge;

producing, by the wireless mobile device, a response from the complete challenge for transmission to an external authentication unit, wherein the response for transmission is the same response generated from the complete challenge; and sending, by the wireless mobile device, the response and the internally produced second portion of the challenge to an external authentication unit without the first portion.

9. The method of claim 8 comprising providing the second portion of the challenge by generating a random number as the second portion of the challenge and combining the random number with the first portion of the challenge to produce the complete challenge and generating the response based on an application of a cryptographic algorithm using both the complete challenge and secret wireless mobile device identification information.

10. The method of claim 8 wherein the received external first portion of the challenge had a first bit length and wherein the internally generated second portion of the challenge has a second and different bit length.

11. The method of claim 8 comprising determining a number of times that a same second portion of the challenge has been used to generate the response and generating a new partial challenge in response to the number of times that a same second portion of the challenge has been used.

12. A method for providing challenge/response based authentication comprising:

wirelessly transmitting a first portion of a challenge to a wireless mobile device;

receiving the first portion of the challenge and providing internally, a second portion of the challenge in response to receiving the first portion of the challenge;

combining the received first portion of the challenge with the internally produced second portion of the challenge to produce a complete challenge;

producing a response from the complete challenge for transmission to the external authentication unit, wherein the response for transmission is the same response generated from the complete challenge;

wirelessly sending the response produced from the complete challenge and the second portion of the challenge without the first portion to an external authentication unit;

receiving the sent response and the second portion of the challenge; and generating an expected authentication response based on a locally stored first portion of the challenge and the received second portion of the challenge and comparing the generated expected authentication response to the received response to determine whether to verify the wireless mobile device.

13. The method of claim 12 comprising providing the second portion of the challenge by generating a random number as the second portion of the challenge and combining the random number with the first portion of the challenge to produce the complete challenge and generating the response based on an application of a cryptographic algorithm using both the complete challenge and secret wireless mobile device identification information.

14. The method of claim 12 wherein the received external first portion of the challenge had a first bit length and wherein the internally generated second portion of the challenge has a second and different bit length.

15. The method of claim 12 comprising determining a number of times that a same second portion of the challenge has been used to generate the response and generating a new partial challenge in response to the number of times that a same second portion of the challenge has been used.

16. The method of claim 12 comprising generating a challenge/expected response pair based on the first portion of the challenge and the received second portion of the challenge and generating a future challenge/expected response pair based on a received future second portion of a challenge and a generated future first portion of the challenge.

17. The method of claim 16 further comprising sending the challenge/expected response pair and the future challenge/expected response pair to a remote unit operative to compare the received response with the expected response to determine if authentication should be granted.

18. A method for providing challenge/response based authentication comprising:

wirelessly transmitting a first portion of a challenge to a wireless mobile device;

generating an expected response based on a locally stored first portion of the challenge and a received second portion of the challenge from the wireless mobile device without the transmitted first portion;

generating a future expected response based on a received future second portion of a challenge; and sending the expected response and the future expected response to a remote unit for comparison with at received response.

19. The method of claim 18 comprising generating a challenge/expected response pair based on the first portion of the challenge and the received second portion of the challenge and generating a future challenge/expected response pair based on the received future second portion of a challenge and a generated future first portion of the challenge.

20. The method of claim 19 further comprising sending the challenge/expected response pair and the future challenge/expected response pair to a remote unit operative to compare the received response with the expected response to determine if authentication should be granted.

* * * * *